March 4, 1924.
A. R. GOLDRICK
1,485,978
METAL CASING FOR LEAF SPRING COVERS
Filed Jan. 10, 1922
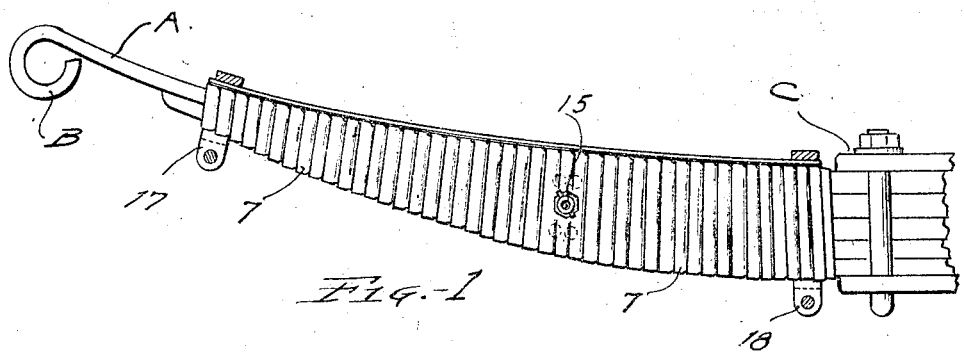
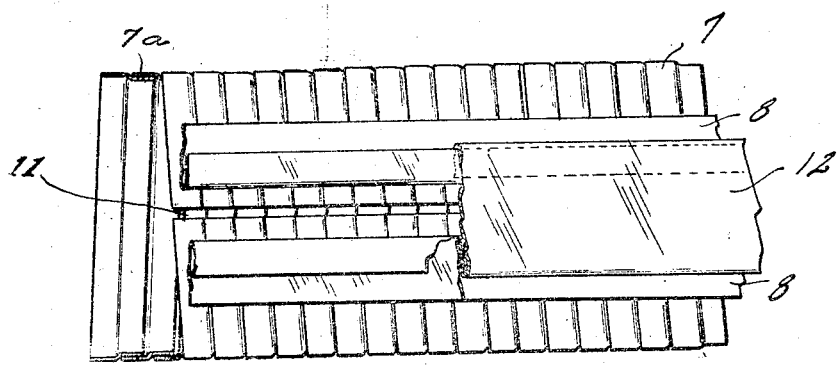
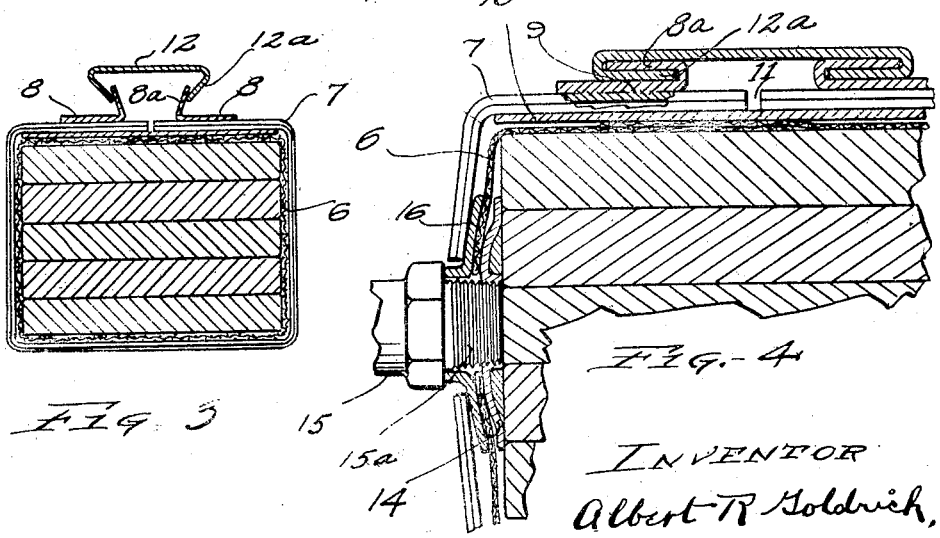
INVENTOR
Albert R Goldrick,
By Baker & Macklin,
ATTORNEYS Patented Mar. 4, 1924.

1,485,978

UNITED STATES PATENT OFFICE.

ALBERT R. GOLDRICK, OF CLEVELAND, OHIO, ASSIGNOR TO CARL W. SCHAEFER, OF LAKEWOOD, OHIO.

METAL CASING FOR LEAF-SPRING COVERS.

Application filed January 10, 1922. Serial No. 528,331.

*To all whom it may concern:*

Be it known that I, ALBERT R. GOLDRICK, a citizen of the United States, residing at Cleveland, in the county of Cuyahoga and State of Ohio, have invented a certain new and useful Improvement in a Metal Casing for Leaf-Spring Covers, of which the following is a full, clear, and exact description, reference being had to the accompanying drawings.

This invention relates to spring covers such as are used on laminated springs of vehicles for protecting the leaves from dust and dirt, and for enabling the spring to be satisfactorily lubricated.

My invention is primarily directed toward the provision of a spring cover which is adapted for use in systems of high pressure lubrication. In furtherance of this object, my invention contemplates the provision of a light sheet metal casing which may be cheaply constructed and easily attached to springs of existing vehicles without requiring the springs to be disconnected. My invention also is concerned with the construction of a cover which permits the normal flexing operation of the spring and at the same time prevents the escape of lubricant during such movement.

In accomplishing the objects above set forth, I provide a spring cover which embodies a lubricant-proof jacket in close fitting engagement with the spring and an armored casing surrounding the jacket whereby a chamber capable of holding lubricant under pressure is secured.

In making the casing, I prefer to wind a strip of metallic ribbon around a mandrel shaped similarly to the spring to be covered, and then to sever the wound casing longitudinally, whereby the casing may be positioned on a spring without disconnecting the spring from the vehicle. My invention also includes means for connecting and closing the severed ends of the wound coils after the casing has been placed over the spring.

The means for carrying out my invention will be more fully set forth in the following description, which relates to the drawings, and the essential characteristics will be summarized in the claims.

In the drawings, Fig. 1 is an elevation of a spring having a cover embodying my invention secured thereto; Fig. 2 is a fragmentary view showing the cover removed from the spring; Fig. 3 is a transverse section taken through the spring shown in Fig. 1 with the closure member in position ready to be pressed against the casing; Fig. 4 is a section similar to that shown in Fig. 3 except that the closure member is in final position against the casing.

In the various figures, I have illustrated my invention as providing a cover for a laminated spring, the top leaf A of which terminates in an eye B to which a spring shackle is adapted to be secured. The intermediate portion or cover for the spring is shown at C as embodying a clamp which is adapted to engage the axle of a vehicle. The spring cover surrounds the leaves between the eye and clamp and forms a fluid-tight pressure chamber, which permits the normal flexing action of the spring, and at the same time maintains the lubricant under pressure during such operation.

This cover comprises a metallic casing 7 which closely embraces a fabric jacket 6 which jacket extends entirely around the spring, and is sealed at the meeting edges by means of a strip 10 which extends the entire length of the casing. The casing 7 may be formed by winding a light metallic ribbon on a mandrel so that each turn of the spiral overlaps the previously laid turn as indicated at 7ª; thus forming in effect a tubular structure. The mandrel employed may be pyramidal in form in accordance with the size of the spring to be covered. After the casing has been shaped in conformation to the mandrel, it is preferably provided with rails 8 which as shown extend longitudinally of the casing and are spot welded, soldered or similarly secured to each turn of the casing strip. These rails are separated, and preferably parallel and have flanges 8ª thereof inclining slightly outwardly as indicated in Fig. 3. After securing these rails in position the casing is severed from end to end between them. In doing this it is desirable to remove a portion of the metal, leaving the severed edges normally slightly separated to permit adjustment.

To secure the casing about the spring, I provide a closure member 12 having inwardly extending flanges 12ª which are complementary to the flanges 8ª, so that when the casing is placed over the spring, the spring tension in the metal holds the severed ends apart. These ends are adapted to be drawn together when the interengaging flanges 8ª and 12ª are pressed flat as shown in Fig. 4.

For enabling lubricant to be injected under pressure within the jacket, I have shown a valve 15 which is provided with a threaded portion 15ª and adapted to engage a nut 14 inside of the jacket. A suitable washer 16 locks the fabric against the nut. In this way, a grease gun carrying lubricant under pressure may be attached to the valve and positive lubrication be assured. To prevent lubricant from escaping between the ends of the casing and the spring, I may employ clamps 17 and 18 which are bolted around the casing as shown in Fig. 1.

The assembling operation of a spring cover constructed according to my invention is as follows:—The fabric jacket is wrapped entirely around the spring and the meeting edges thereof are covered by a strip 10 extending longitudinally of the spring. Then the casing 7 which has previously been formed is sprung over the jacket so that the split side with the flanged members 8ª will lie over the strip 10. Then the closure member 12 is brought into engagement with the flanges 8ª and pressed down against the casing to the position indicated in Fig. 4.

The valve 15 is threaded into the nut 14 which has previously been secured to the jacket, and then the clamps 17 and 18 are secured to the ends of the casing, whereupon lubricant may be injected under pressure through the valve 15, and the casing is ready for use. While the spring is being flexed, the construction of the casing permits adjacent turns, or short sections, to move relatively to each other without allowing the jacket to bulge outwardly, and without permitting any lubricant to escape therefrom.

An advantage of a casing constructed in accordance with my invention is that the entire structure may be previously formed on a mandrel and readily attached to existing springs without disconnecting them from the vehicle, and that such cover may be satisfactorily used in connection with high pressure systems of lubrication without loss of lubricant. Furthermore, the casing does not hinder the normal flexing action of the spring.

Having thus described my invention, I claim:—

1. A spring cover comprising a spiral casing adapted to engage the spring on three sides thereof, and a closure member for the fourth side, said member cooperating with the casing to form a tube completely surrounding the spring.

2. A spring cover comprising a metallic ribbon wound in a spiral to form a casing of a shape corresponding to the shape of the spring to be covered, so that one turn overlaps an adjacent turn, and means joining the casing longitudinally of the spring.

3. A vehicle spring cover comprising in combination, a fabric jacket extending entirely around the spring to be covered, and a spiral casing embracing the jacket on substantially four sides thereof, one of the casing sides being split longitudinally whereby the casing may be positioned over the spring without disconnecting the latter from the vehicle, and means whereby the split side of the casing may be held together so as to form a fluid-tight pressure chamber around the spring.

4. A vehicle spring cover comprising in combination, an integral casing surrounding the spring on four sides thereof, said casing comprising a continuous strip of metal spirally wound to conform to the contour of the spring and slit throughout its length adjacent one side of the spring, and means for closing the severed ends to form a fluid-tight pressure chamber around the spring.

5. A spring cover comprising a casing extending on three sides of the spring to be covered, and partially across the fourth side, said casing being formed of a strip of metallic ribbon wound spirally and then slit longitudinally through its length, a rail extending longitudinally of the casing and secured to each of the severed portions, and a closure member adapted to bridge said slit and to engage said rails, whereby a fluid-tight pressure chamber is formed around the spring.

6. A spring cover comprising a metallic casing formed of metallic ribbon wound spirally around the spring, said casing being severed on one side, means for retaining the turns in spiral relation to each other after the casing has been severed, and a closure member adapted to lock the severed ends together, whereby a fluid-tight pressure chamber is formed around the spring.

7. A spring cover comprising in combination, a laminated spring, a jacket surrounding the spring, a metallic casing closely embracing the jacket on three sides thereof, said casing being formed by winding a strip of metallic ribbon in spiral form, a flanged rail adapted to hold the ends of the several turns in spiral relation to each other, and a closure member for locking the casing to the jacket and adapted to engage said flanges.

8. In combination, a laminated spring, a fabric jacket entirely surrounding the spring, a casing comprising U-shaped strips of metallic ribbon in engagement with the spring and with each other, the ends of the strips terminating short of each other when folded upon the spring, the end of each strip being rigid relative to an adjacent strip, and means for bridging the gap between said ends and for locking them together, whereby a fluid-tight pressure chamber is formed around the spring.

9. In combination, a laminated spring, a fabric jacket entirely surrounding the spring, a casing comprising U-shaped strips of metallic ribbon laid in spiral form with one strip overlapping an adjacent strip, the free ends of the strips terminating short of each other when folded upon the spring, a pair of rails extending longitudinally of the spring and rigidly secured to each of said U-shaped strips, and a flanged closure member in engagement with said rails for completing the casing.

10. In combination, a laminated vehicle spring and cover therefor, including a fabric jacket in intimate contact with the spring, a metallic casing enclosing the jacket and comprising a series of spirally formed strips of metallic ribbon in overlapping relation and parted longitudinally of said spring, and means rigid with each turn of said ribbon strips for maintaining them in relative engagement when said spring is deflected.

11. A vehicle spring cover comprising a series of spirally formed overlapping metallic strips, each spiral turn being parted and means connecting the strips along a common longitudinal joint.

12. A vehicle spring cover comprising a series of spirally formed overlapping metallic strips, means for maintaining the individual strips in relative relation, and means for joining the strip ends, said means extending longitudinally of the casing.

13. A vehicle spring cover comprising a series of spirally formed overlapping metallic strips, means for maintaining the ends of the individual strips in fixed longitudinal position, and means for connecting the ends of the strips, whereby a substantially flexible tubular structure is obtained.

In testimony whereof, I hereunto affix my signature.

ALBERT R. GOLDRICK.